T. TERREL.
Plow-Cleaner.

No. 57,216. Patented Aug. 14, 1866.

Witnesses:
Jas A Service

Inventor:
Timothy Terrel
Per Munn & Co
Attorneys

UNITED STATES PATENT OFFICE.

TIMOTHY TERREL, OF SPRING HILL, OHIO.

IMPROVEMENT IN PLOW-CLEANING ATTACHMENTS.

Specification forming part of Letters Patent No. 57,216, dated August 14, 1866.

*To all whom it may concern:*

Be it known that I, TIMOTHY TERREL, of Spring Hill, Champaign county, Ohio, have invented a new and Improved Plow-Cleaning Attachment; and I do hereby declare that the following is a full, clear, and exact description thereof, which will enable those skilled in the art to make and use the same, reference being had to the accompanying drawings, forming part of this specification, in which—

Figure 1:
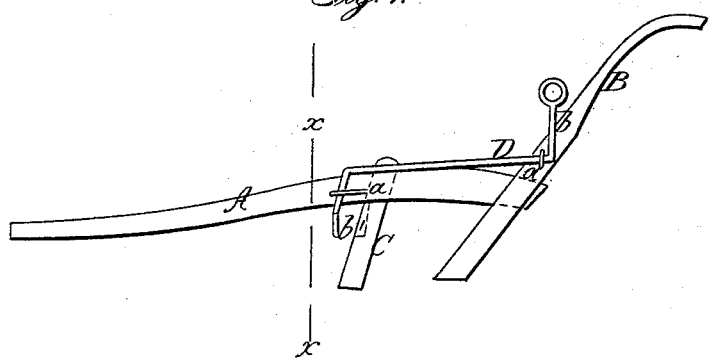
Figure 2:

Figure 1 is a side view of a plow with my invention applied to it; Fig. 2, a transverse vertical section of the same, taken in the line *x x*, Fig. 1.

Similar letters of reference indicate corresponding parts.

This invention relates to a new, simple, and useful attachment for plows, whereby the same are effectually prevented from becoming choked or clogged up with weeds and trash during the operation of plowing.

A represents the beam of the plow; B, the handle thereof; and C, the standard, mortised or otherwise secured to the beam. These parts are of usual construction, and therefore do not require a minute description.

D represents a bar or rod, which is fitted in guides *a*, attached to the beam A at one side and to the handle B. This rod is nearly in a horizontal position, and is allowed to slide freely in the guides *a*, the back end of the rod being bent vertically upward or having an upright part, *b*, attached to it to serve as a handle. The front end of the rod D is bent downward by the side of the beam, and then bent horizontally underneath the same, and then bent downward again, as shown clearly at *b'* in Fig. 2, said bent portion *b'* being in front of the upper part of the standard C.

In plowing, the standard C is very liable to cause the plow to choke or clog, weeds and trash collecting under the beam in front of the standard. The plowman at any time may dislodge the weeds and trash by shoving forward the rod D or moving it forward and backward a few times, the rear upright part or handle *b* of rod D being within convenient reach of the plowman.

Having thus described my invention, I claim as new and desire to secure by Letters Patent—

The sliding rod D, applied to a plow substantially in the manner as and for the purpose herein set forth.

TIMOTHY TERREL.

Witnesses:
BENJAMIN DAVIS,
J. S. CRAIG.